United States Patent [19]

Schulz et al.

[11] Patent Number: 4,607,076

[45] Date of Patent: Aug. 19, 1986

[54] BETAINE COPOLYMERS-VISCOSIFIERS FOR WATER AND BRINE

[75] Inventors: Donald N. Schulz, Annandale, N.J.; Kissho Kitano, Ohi, Japan

[73] Assignee: Exxon Research and Engineering Co., Florham Park, N.J.

[21] Appl. No.: 688,236

[22] Filed: Jan. 2, 1985

[51] Int. Cl.$^4$ ............................................. C08K 3/16
[52] U.S. Cl. ..................................... 524/548; 524/401
[58] Field of Search ................ 524/808, 548, 401

[56] References Cited

U.S. PATENT DOCUMENTS

| | | | |
|---|---|---|---|
| 3,406,155 | 10/1968 | Azorlosa | 524/808 |
| 4,330,451 | 5/1982 | Straub | 524/808 |
| 4,490,261 | 12/1984 | Heilweil | 524/548 |

Primary Examiner—Christopher A. Henderson

Attorney, Agent, or Firm—Richard E. Nanfeldt

[57] ABSTRACT

A water soluble copolymer having the structure:

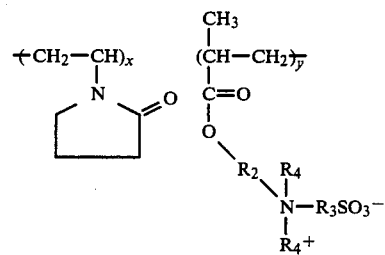

wherein X is about 1 to about 99 mole percent and y is about 99 to about 1 mole percent.

1 Claim, No Drawings

BETAINE COPOLYMERS-VISCOSIFIERS FOR WATER AND BRINE

BACKGROUND OF THE INVENTION

Poly(sodium acrylamidomethyl propane sulfonate) P(NaAMPS), hydrolyzed polyacrylamide, and poly(vinylpyrrolidone) and copolymers thereof are water soluble polymers that have been previously disclosed in the literature and have found application in the viscosification of aqueous solutions which is achieved through a combination of high molecular weight and chain expansion due to repulsion of pendant ionic groups along the polymer chain or H-bonding. These polymers are salt-sensitive, thereby limiting their application in highly saline systems.

The betaines are a special class of zwitterions. These materials are self neutralized and contain no counter-ions. Moreover, the positive and negative charges are separated by alkyl groups.

Carboxymethacrylate betaine monomers (I) and polymers (II) are well-known and disclosed in U.S. Pat. No. 2,777,872 (Jan. 15, 1957), U.S. Pat. No. 2,834,758 (May 13, 1958) and U.S. Pat. No. 2,846,417 (Aug. 5, 1958).

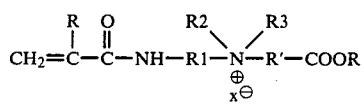
(I)

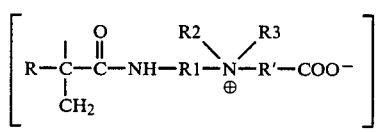
(II)

Carboxyvinylpyridine betaine monomers and homopolymers (III) have also been reported [H. Ladenheim and H. Morawetz, J. Poly. Sci. 26, 251 (1957)].

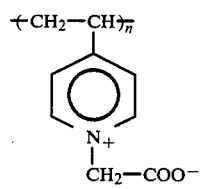
(III)

Sulfovinylpyridine betaine monomers and homopolymers (IV) are known [R. Hart and D. Timmerman, J. Poly. Sci. 28, 118 (1958)] and Ger. Auslegeshrift No. 1,207,630 and Galin, et al., Polymer 25, 121,254 (1984).

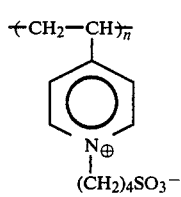
(IVA)

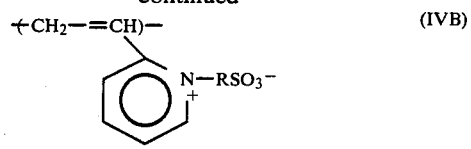
(IVB)

The butylsulfobetaine of poly(2-vinylpyridine) is soluble in water, but the butylsulfobetaine of poly(4-vinylpyridine) is not. Both betaines are soluble in salt solution.

Methacrylate based sulfobetaine monomers and homopolymers (V) are described by Galin Polymer 25, 121,254 (1984) and Ger. Auslegeshrift No. 1,207,630.

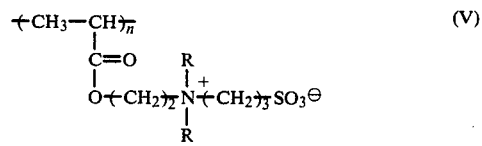
(V)

More recently, reports of vinylimidazolium sulfobetaine homopolymers (VI) have appeared [J. C. Salamone, et al Polymer 18, 1058 (1977); Polymer 19, 1157 (1978)].

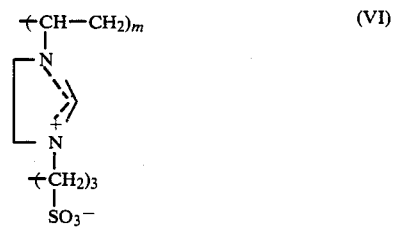
(VI)

These homopolymers are insoluble in water, but soluble in certain salt solutions. In contrast to normal polyelectrolytes, the reduced viscosity of the soluble imidazolium sulfobetaine polymers increase with increasing salt concentration.

SUMMARY OF THE INVENTION

The present invention relates to unique and novel betaine copolymers which are copolymers of N-vinyl pyrolidone and ester-, amide- and vinyl pyridine-based betaine monomers. Such polymers contain both positive and negative charges and are represented by the following structures:

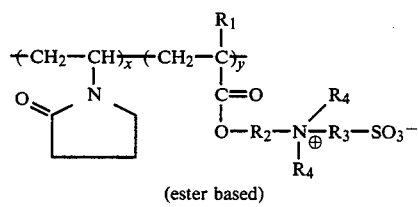
(ester based)

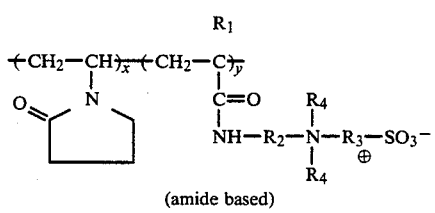
(amide based)

-continued

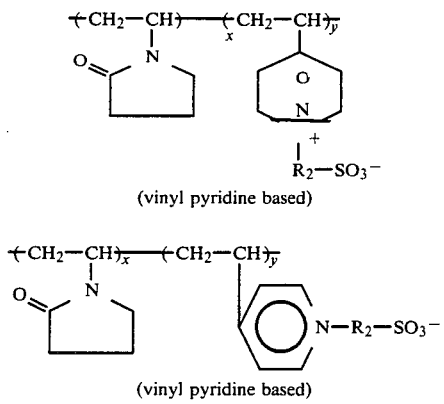

(vinyl pyridine based)

(vinyl pyridine based)

wherein x is about 99 to about 1 mole percent and y is about 1 to about 99 mole percent. $R_1$ is methyl or hydrogen, $R_2$ is alkyl group of 1–5 carbons and $R_3$ is an alkyl group from 3–4 carbons, $R_4$ is an alkyl group of 1–5 carbon atoms.

Thus, the structures are different from conventional polyelectrolytes, which contain either positive or negative charges. In addition, unlike conventional polyelectrolytes, the aqueous viscosities of the instant materials are unaffected or may actually increase in the presence of salts like sodium chloride.

The present invention is distinguished from the carboxymethacrylate betaine homopolymers and copolyers (U.S. Pat. Nos. 2,777,872, 2,834,758, 2,846,417) because sulfonate vs. carboxylate anions and low vs. high charge densities are used. Furthermore, carboxylate anions are limited by their known susceptibility to precipitation by polyvalent cations (e.g. $Ca^{++}$); the latter species are often found in geological formations [F. J. Glaris in "Water Soluble Resins" 2nd Ed, R. L. Davidson and M. Sittig, Eds. Rheinhold, NY, p. 168]. Sulfonate anions are not so limited.

The present invention is distinguished from the previous sulfobetaine work because it involves NVP copolymers rather than homopolymers. These NVP-betaine copolymers show superior viscosities in salt compared with conventional NVP-ionic copolymers.

GENERAL DESCRIPTION OF THE INVENTION

The present invention relates to a method for increasing the viscosity of an aqueous solution which comprises the step of dissolving about 0.1 to about 5.0 wt.% of a water soluble NVP-betaine copolymer in the aqueous solution, wherein the aqueous solution is selected from the group consisting of water, a brine solution, an acid solution or a base solution, and the concentration of the salt, acid or brine in the aqueous solution is about 0.01 to about 20.0 wt.%

The viscosifying agents for aqueous and saline solutions of the present invention are betaine copolymers formed by a homogeneous, free radical, copolymerization, wherein the water soluble copolymers are characterized by the formulae:

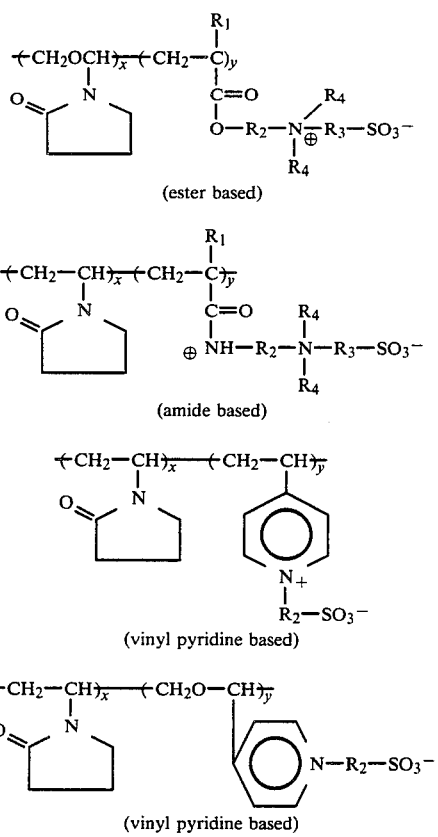

(ester based)

(amide based)

(vinyl pyridine based)

(vinyl pyridine based)

wherein x is about 99 to about 1 mole percent, more preferably about 80 to about 20 mole percent, and most preferably about 70 to about 30 mole percent, y is about 1 to about 99 mole percent, more preferably about 20 to about 80 mole percent, and most preferably about 30 to about 70 mole percent. $R_1$ is methyl or hydrogen, $R_2$ is an alkyl group of 1–5 carbon atoms, $R_3$ is an alkyl group of 3–4 carbon atoms, and $R_4$ is an alkyl group of 1–5 carbon atoms.

The viscosities of aqueous solutions of these betaine copolymers were measured by means of a Contraves TM low shear viscometer model LS30 using a No. 1 cup and No. 1 bob. Temperatures were controlled to $\pm 1°$ C., and measurements were made at a rotational speed that gave a shear rate of 1.28 $s^{-1}$.

The homogeneous copolymerization process of the instant invention comprises the steps of forming a mixture of N-vinylpyridine and betaine monomer under a nitrogen atmosphere; adding deoxygenated water to said mixture to form a reaction solution; heating said reaction solution to at least 50° C.; adding a free radical initiator to said reaction solution to initiate the copolymerization of the acrylamide monomer and the betaine monomer; polymerizing the monomers at a sufficient temperature and for a sufficient time to form the water soluble copolymer of N-vinyl pyrrolidone and betaine monomer; and recovering the water soluble copolymer from the reaction solution.

Suitable free radical initiators for the instant free radical-copolymerization process are potassium persulfate; sodium thiosulfate, potassium persulfate mixture; benzoyl peroxide, and other common free radical initiators. The concentration of the free radical initiator is about 0.02 to about 0.50 grams per 100 grams of total monomer.

Polymerization of the N-vinyl pyrrolidone monomer and M-3(3-sulfopropyl)-N-methacryl-oxyethyl-N,N-dimethyl-ammoniabetaine monomer is effective at a temperature of about 25° to about 90° C., more preferably at about 30° to about 65° C., and most preferably at about 45° to about 55° C. for a period of about 1 to about 48 hours, more preferably at about 2 to about 36, and most preferably at about 4 to about 24. A suitable method for recovery of the formed copolymer from the reaction solution comprises precipitation by means of acetone.

DESCRIPTION OF THE PREFERRED EMBODIMENTS

The following examples illustrate the present invention without, however, limiting the same hereto.

EXAMPLE 1

Copolymers of NVP and Ester-Based Betaine (SPE)

A 2,000 ml resin flask was set up with a condenser, a thermometer, a stirring rod with feed and $N_2$ inlet and outlet. The reaction flask was flushed in $N_2$ over night.

Acrylamide used in this experiment was recyrstallized from acetone. SPE, N-(3-sulfopropyl)-N-methacroyloxyethyl-N,N-dimethyl ammonium betaine, was supplied by Howard Hall International. AIBN, the initiator, was recrystallized from methanol. Water was boiled under $N_2$ and cooled under $N_2$.

90/10 mole % Poly (NVP-Co-SPE)     M/VI = 15

$CH_2=CH + CH_2 = C-C-O-CH_2-CH_2-N-CH_2-CH_2-CH_2-SO_3$

| | | |
|---|---|---|
| C=O | | $CH_3$ |
| $NH_2$ | 65 g | .0833 g AIBN |
| 23.45 g | | 470 g $H_2O$ |
| | | 18 hours |

Both monomers were mixed in water inside the reaction flask. The monomers mixture was clear. The mixture was heated to 60° C. and AIBN (0.0833 g) was added as solid in the reaction mixture.

The polymerization was continued for 18 hours and the final product was precipitated in acetone. Elemental analysis of the product was 2.28% S, 55.94% C, 8.35% H, 9.48% N.

Similar experiments were run at a ratio of 10/90 and 5050 NVP/SPE.

EXAMPLE 2

Salt Sensitivity of NMP-Ester Based Copolymers

Fifteen weight percent was dissolved in the following salt solutions:

| | % NaCl | N CPS |
|---|---|---|
| 90/10 NVP/SPE | | |
| 1.5% | 0 | 3.13 |
| 1.5% | 2 | 4.20 |
| 1.5% | 5 | 4.71 |
| 1.5% | 10 | 5.52 |
| 1.5% | 20 | 6.50 |
| 10/90 NVP/SPE | | |
| 1.5% | 0 | Cloudy |
| 1.5% | 2 | 3.71 |
| 1.5% | 5 | 4.69 |
| 1.5% | 10 | 6.19 |
| 1.5% | 20 | 9.16 |
| 50/50 NVP/SPE | | |
| 1.5% | 0 | Cloudy |
| 1.5% | 2 | 3.96 |
| 1.5% | 5 | 5.38 |
| 1.5% | 10 | 6.70 |
| 1.5% | 20 | 9.34 |

In contrast, the viscosity of a copolymer NVP with a simple ionic monomer (NaAMPS) declined in salt.

| 50/50 NVP/NaAmps | % NaCl | N CPS |
|---|---|---|
| 1.5% | 0 | 6.5 |
| 1.5% | 2 | 2.2 |
| 1.5% | 5 | 2.1 |
| 1.5% | 10 | 2.2 |
| 1.5% | 20 | 2.3 |

This Example shows the superior salt response of the instant copolymer with conventional ionic copolymers of NVP.

EXAMPLE 3

Copolymers of NVP and Amide Based Betaines (SPP)

NVP/SPP copolymers were prepared in 150 ml $H_2O$ at 16.7% total solids level, at a M/VI=1.50 at 60° C. with AIDN as initiator. The NVP/SPP ratio was varied from 0/80 to 80/20. Product compositions were determined by elemental analysis. SPP is N-(3 sulfopropyl)-N-methacramidopropyl-N-N-dimethylammonium betaine, available from Howard Hall Company.

EXAMPLE 4

Copolymer of NVP and Vinyl Pyridine-Based Betaine (SPV)

A NVP/SPV copolymer was prepared in 150 ml of $H_2O$ at 16.7% total solids, at a M/Vi=15.0 at 60° C. with AIBN as the initiator. SPV is a sulfopropyl betaine of 2-vinyl pyridine, available from Howard Hall Company. The NVP/SPV ratio was 50/50. The polymerization reached 15% conversion in 6 hours.

What is claimed is:

1. A method for increasing the viscosity of a brine solution which comprises the step of dissolving in said brine solution a water soluble copolymer having the structure:

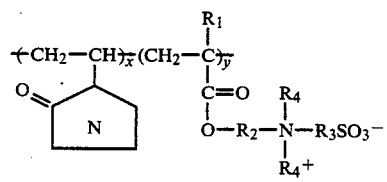

wherein x is about 10 to about 90 mole %, y is about 10 to about 90 mole %, $R_1$ is methyl or hydrogen, $R_2$ is an alkyl group of 1-5 carbon atoms, $R_3$ is an alkyl group of 3 to 4 carbon atoms and $R_4$ is an alkyl group of 1-5 carbon atoms.

* * * * *